July 28, 1964 G. E. COMSTOCK 3D 3,142,829
CHECKING METHOD FOR DIGITAL MAGNETIC TAPE SYSTEMS EMPLOYING DOUBLE TRANSITION HIGH DENSITY RECORDING
Filed Aug. 22, 1960
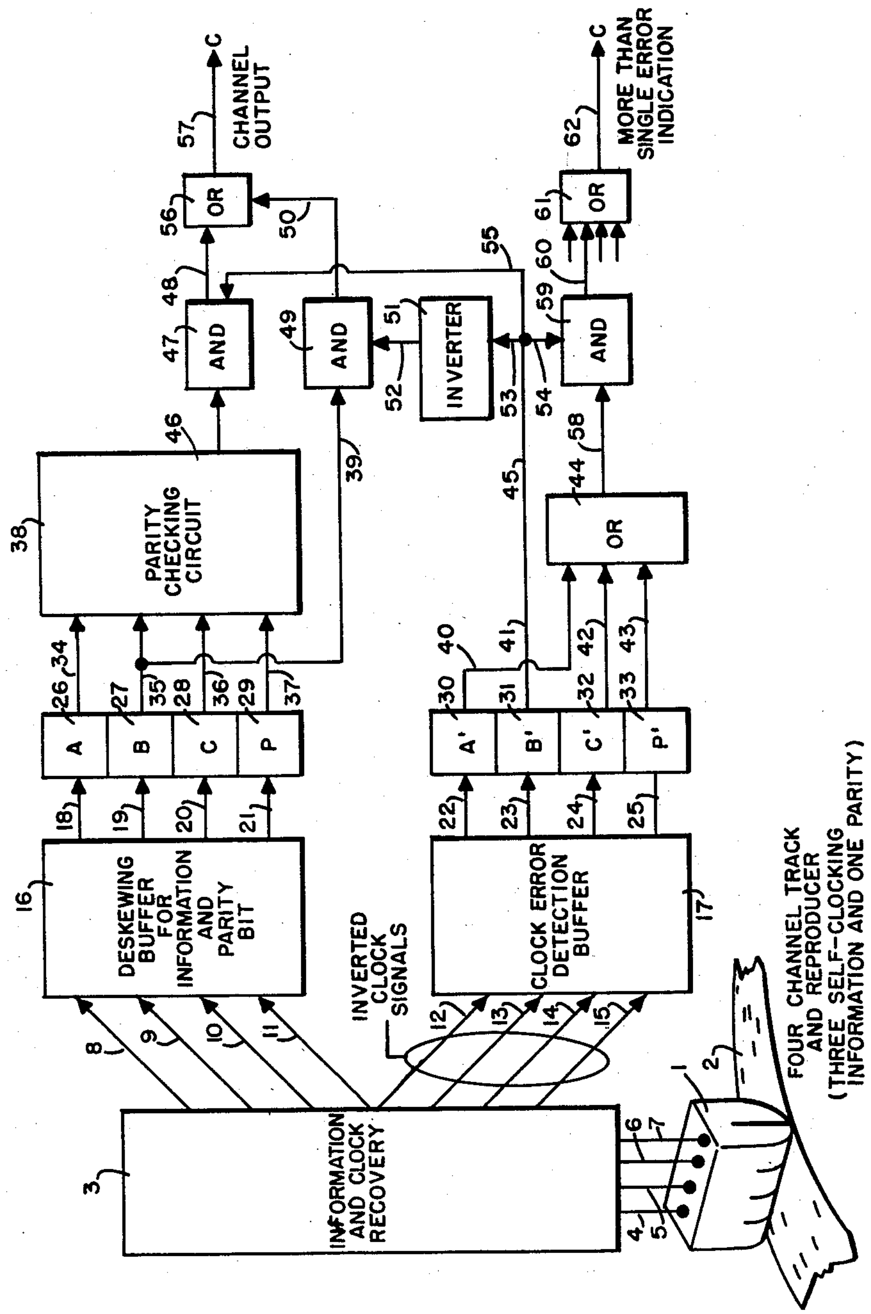
*INVENTOR.*
GEORGE E. COMSTOCK 3D
*BY* Alfred W. Barber
ATTORNEY

United States Patent Office 3,142,829
Patented July 28, 1964

3,142,829

CHECKING METHOD FOR DIGITAL MAGNETIC TAPE SYSTEMS EMPLOYING DOUBLE TRANSITION HIGH DENSITY RECORDING

George E. Comstock 3d, Lloyd Harbor, Huntington, N.Y., assignor to Potter Instrument Co., Inc., Plainview, N.Y., a corporation of New York Filed Aug. 22, 1960, Ser. No. 51,103
20 Claims. (Cl. 340—174.1)

The present invention concerns digital recording on magnetic tape or the like and, in particular, methods of and means for checking the accuracy of information recorded including a parity checking system and including methods of and means for automatically correcting certain errors in the output of the device.

Reference is made to the recording system described by Andrew Gabor in a magazine article entitled "High Density Recording on Magnetic Tape," published in the magazine Electronics in the October 16, 1959, issue. In this recording system a clock bit is recorded in every information position in each channel so that in playback the clock information may be separated from the digital information providing a recording which may be called "self-clocking." According to one aspect of the present invention the separated clock information is examined to determine whether a clock bit has been received within the proper time following the detection of the previous clock bit. To accomplish this a timing circuit is included which has a period equal to one cell time. The circuits utilized to accomplish this clock test are similar to those shown and described in the application for Letters Patent of Andrew Gabor entitled "Magnetic Tape Testing Device," filed on May 3, 1960, and bearing Serial Number 26,537, now Patent No. 3,071,723.

This checking method is reliable as a test because of the fact that with high density recording a tape defect or dust particle capable of reducing the playback amplitude of one flux transition below the threshold of detectability invariably reduces the amplitude of one or more adjacent bits by a similar amount. Therefore, since each information bit is bracketed by a pair of clock bits, if both clock bits are present, we may be certain the information bit was likewise present. While this checking of the clock signal may be utilized to indicate the presence of error, it does not provide any method of correcting the error. On the other hand it has an advantage over the parity checking method in that it provides a dropout check for each channel of recording, thereby providing detection of both even and odd numbered errors. According to the present invention, this clock check system is combined with a parity check providing a powerful means of error detection and at the same time a method of correcting certain types of errors not possible before. According to the present invention, when the clock signal checking system reveals the presence of an error in one channel of a multichannel high density recording, then an associated parity bit check can be used to indicate whether the bit in error was a one or a zero.

For example, let us assume a six bit information character and a single parity channel, making a total of seven channels of recording. If a character having an even number of information bits is recorded, then a one is recorded in the parity channel to make the total number of bits odd. If the clock dropout testing part of the system reveals that a signal has been lost in one of the bit positions in one of the six information channels, then if the total number of remaining bits is odd, the indication shows that the bit in error should be a zero. However, if the total number of bits remaining is even, then the indication shows that the lost bit was a one. This one may be reinserted in the signal pattern to provide a corrected output.

The present invention has a great deal of significance and value in a digital recording system where the highest reliability of information recovery is required. For example, under conditions of proper operation the intrinsic reading reliability of a high density recording system may be on the order of one bit drop out in $10^8$ bits read out. However, because the clock signal synchronization is required for loading the deskewing buffer, if one clock bit is lost, then the balance of information in that particular track loses synchronization and cannot be properly interpreted in the output buffer. Thus, if a particular system employs a blocked format in which 2000 characters are recorded per block, then the loss of a single clock bit will cause the loss, on the average, of 1000 bits. Therefore, in such a system if the intrinsic reliability is one bit in $10^8$, this loss of a block will reduce the net reliability to one bit in $10^5$. However, by using the automatic error correcting system of the present invention this average probability of loss in one channel of blocked information is raised from one in $10^5$ to an effective rate of approximately one in $10^{10}$. Thus, it has been shown according to the present invention that when a parity checking system is combined with an error checking system adapted to self-clocking high density recordings, it is possible to detect errors and also to correct at least some of these errors raising the reliability of the total system to a considerably higher level.

Thus, according to the present invention, four significant conditions may exist. First, the parity check may show that an error exists meaning that a "one" is missing from one of the information channels. The parity check in the presence of an error produces a "one" output signal. The clock check will show the error channel and a second "one" will be provided. These two "ones" applied to an "and" gate provide a "one" which in an "or" circuit supplies the missing bit to the output channel. This may be termed automatic single-bit error correction in a parallel feed digital information magnetic recording system.

Second, the parity check shows an error but no error is shown in any information channel by the clock check. This means that the drop-out exists only in the parity channel and since only one signal is applied to the "and" gate no correction is made or required.

Third, the clock check shows an error but the parity check shows no error indicating that the error bit is a "zero." In this case, also, only a single signal is applied to the "and" gate and no correction to any signal is made or requested.

Fourth, if the clock check shows two or more errors at the same time, any two error indicating signals will combine in a second "and" circuit and proceed to an indicator for "more than one error" which indicates the errors which have not been corrected exist.

Accordingly one object of the present invention is to provide a method of and means for drop-out testing of digital magnetic recordings and the like.

Another object of the present invention is to provide a method of and means for correcting single errors in digital magnetic recording and the like.

A further object is to greatly increase the reliability in digital magnetic recording and the like.

A still further object is to utilize the derived clock signal from a high density self-clocking digital magnetic recording for examining the output signal for drop-out or error.

These and other objects of the present invention will be apparent to those skilled in the art from the detailed description of the invention given in connection with the various figures of the drawing.

In the drawing:

The drawing shows a block diagram of the preferred form of the present invention.

In order to simplify the explanation of the invention, a simple three element code has been assumed. The operation of the invention in conjunction with other and more complex codes will be evident as being a simple numerical extension. The three bits per character plus a parity checking bit may be assumed to have been recorded on a suitable medium such as magnetic tape 2 where it is shown as a fragment since conventional tape handling equipment may be assumed and hence is not shown. The information may also be assumed to be of the self-clocking form as described above. The information containing the clock information is picked up from the magnetic tape by means of a suitable four channel record/playback head 1 and the resulting electrical signals are applied to the information and clock recovery circuit 3 over independent leads 4, 5, 6 and 7. This information and clock recovery circuit 3 may be in accordance with the disclosure referred to above and providing two separate outputs, one consisting in the recovered information signals and the parity signal, and the other consisting in the recovered clock signals. The information signals are fed over leads 8, 9 and 10 and the parity signal over lead 11 to the deskewing buffer 16 also in accordance with the disclosure of the reference application. The recovered clock signals are fed over leads 12, 13, 14 and 15 to the clock error detection buffer 17 which may be any suitable clock error detection buffer such as that described in application for Letters Patent filed by Andrew Gabor on May 3, 1960, and bearing Serial Number 26,537. The deskewed information and parity bit signals from deskewing buffer 16 are fed over lines 18, 19, 20 and 21 to output registers 26, 27, 28 and 29 respectively which have also been designated A, B, C and P respectively to represent that they receive A, B and C channel information and P for parity bit respectively. These may be simple single bit registers such as a conventional flip-flop stage acting as suitable holding and coupling means at this point. Similarly the clock information is fed over lines 22, 23, 24 and 25 to single bit registers 30, 31, 32 and 33 respectively designated A′, B′, C′ and P′ to represent channels corresponding with A, B, C and P above. Each channel A, B, C and P is independently connected to a suitable parity checking circuit 38 over lines 34, 35, 36 and 37 respectively. This parity checking circuit may be of conventional design and providing an output pulse over line 46 in each event of an error or drop out as detected by the parity check. Up to this point all circuits have been described for each of the three information channels and the fourth parity bit channel. In order to simplify the description and render it clearer, from this point on the circuits utilized to complete the functions in connection with the B and B′ channels will be described in particular.

The output of the parity checking circuit is fed over line 46 to AND circuit 47. A branch line 39 is connected from the B channel at the input to the parity checking circuit at 38 to the AND circuit 49. All registers in the clock circuit side except B′, the channel being followed, are connected to the OR circuit 44 over lines 40, 42 and 43. The clock register 31 for the channel B′ being followed is connected over line 41 to AND circuit 59 over lead 54 and to inverter 51 over lead 53. The output of OR circuit 44 is connected over line 58 to AND circuit 59. The output of AND circuit 59 is connected to OR circuit 61 over line 60 and the output of OR circuit 61 consisting of an indication of more than a single error is connected over line 62. The register 31 signal is also applied over lines 41 and 55 to AND circuit 47. A parallel circuit from the connection 35 from the B information register is made over line 39 to AND circuit 49. The inverted clock error signal from inverter 51 is also applied to AND circuit 49 over line 52. Line 48 connects AND gate 47 to OR gate 56 and line 50 connects AND gate 49 to OR gate 56. Resulting corrected signals from OR gate 56 pass out over line 57.

The circuits outlined in the above paragraph will now be described in terms of functions which they perform. If there is no error for a given bit in the B channel as evidenced by the lack of a parity checking circuit output over line 46 and the lack of a clock error detection signal at B′, two sequences are possible. In the first sequence a zero appears in the B channel and since there is no error a zero also appears in the B′ channel. The zero from B passes over line 39 to AND gate 49 but since this gate receives the zero from B′ inverted in 51 and thus a one over line 52 passes nothing to OR gate 56 and the output over line 57 is a zero. In the second sequence a one appears in channel B and since it is correct a zero indicating no error appears in channel B′. This zero in B′ is inverted at 51 and so AND gate 49 receives a one over line 39 and a one over line 52 and passes a one over line 50 to OR gate 56 which in turn feeds the correct signal, a one out over line 57. Now suppose there is an error or drop-out in channel B. In this case also two sequences are possible. In the first the desired signal in channel B is a one but due to drop out is missing. This one missing in the B channel actuates the parity checking circuit producing a one on output line 46 and at AND gate 47. This missing one also produces an error signal in clock channel B′ so that it too provides an output one. This output one is inverted at 51 and inhibits AND gate 49 and at the same time is applied to AND gate 47 over line 55. AND gate 47 receiving a one from line 46 and a one from line 55 passes a one over line 48 to OR gate 56 which produces an output one on line 57. This sequence will be seen to be that of supplying a missing one or the automatic correction of an error in the information signal derived from the magnetic tape. The second error sequence takes place when the bit at the error channel B is a zero. Since the parity check only recognizes missing ones, it produces no error signal on line 46 and AND gate 47 is inhibited. The error signal at B′ (a one) is inverted in 51 and also appears as a zero to inhibit AND gate 49. Thus with both gates 47 and 49 inhibited only zeros can appear on lines 48 and 50 and in output line 57, the correct bit.

In case more than one error has taken place in the recording at this point one or more error indicating ones will be applied from A′, C′ or P′ to OR gate 44 which will produce an output which will combine in AND gate 59 with an error signal from another channel so that an output is produced on line 60 to OR gate 61 and from these to output line 62 to show more than a single error. It will be apparent than an additional gate 44, 47, 49, 51 and 59 is required for each channel which will function for a given channel as has been described above channel B. The error indication on line 62 indicating more than one error is required to indicate the presence of uncorrected errors.

While only a single embodiment of the present invention has been shown and described, many modifications will be apparent to those skilled in the art and within the spirit and scope of the invention as set forth in particular in the appended claims.

What is claimed is:

1. In a digital information recovery system, the combination of, a transducer for deriving information-containing signals and timing signals from a recording medium, a parity checking circuit for providing a signal in response to a detected parity error, a clock error detecting circuit for providing a signal in response to a detected clock error, an information and clock recovery circuit connected with said transducer for providing information-containing signals to said parity checking circuit and timing signals to said clock error detecting circuit, an AND circuit, and means to connect a signal provided by said parity checking circuit and a signal provided by said clock error detecting circuit to said AND circuit for providing a correct signal output in response to an error detected by both said parity checking circuit and said clock error detecting circuit.

2. In a digital information recovery system as set forth in claim 1 wherein said transducer and each of said circuits is adapted to process information-containing signals from a plurality of tracks on said recording medium.

3. In a digital information recovery system as set forth in claim 1 including coupling circuit means connected at the input to said parity checking circuit.

4. In a digital information recovery system as set forth in claim 1 including coupling circuit means connected at the output of said clock error detecting circuit.

5. In a digital information recovery system as set forth in claim 1 including coupling circuit means connected at the input to said parity checking circuit, and separate coupling circuit means connected at the output of said clock error detecting circuit.

6. In a digital information recovery system, the combination of, a transducer for deriving information-containing signals and timing signals from a recording medium, a parity checking circuit for providing a signal in response to a detected parity error, a clock error detecting circuit for providing a signal in response to a detected clock error, an information and clock recovery circuit connected with said transducer for providing information-containing signals and separate timing signals, a deskewing circuit connected to receive said information-containing signals, means to connect the separate timing signals from said recovery circuit to said clock error detecting circuit, first coupling circuit means to provide an input for said parity checking circuit responsive to an output from said deskewing circuit, second coupling circuit means connected at the output of said clock error detecting circuit, an AND circuit, and means to connect a signal provided by said parity checking circuit and a signal provided by said second coupling circuit means to said AND circuit for providing a correct signal output in response to an error detected by both said parity checking circuit and said clock error detecting circuit.

7. In a digital information recovery system as set forth in claim 6 wherein said transducer and each of said circuits are adapted to process information-containing signals from a plurality of tracks on said recording medium.

8. In a digital information recovery system as set forth in claim 6 including a second AND circuit, means to connect the output of said first coupling circuit means also to said second AND circuit, means to connect the output of said second coupling circuit means also to said inverter circuit to provide a second input for said second AND circuit so that a correct output is provided for a correct information signal.

9. In a digital information recovery system as set forth in claim 6 including an error detecting circuit for providing an indication when more than a single error is detected.

10. In a digital information recovery system as set forth in claim 8 including an OR circuit means to provide an output responsive to an output from either said first AND circuit or said second AND circuit.

11. In a digital information recovery system, the combination of, a transducer for deriving a regular periodic signal from a recording medium, a code checking circuit for providing a signal in response to a detected code error, an information recovery circuit connected with said transducer for providing information-containing signals from said regular periodic signal to said code checking circuit, and circuit means connected with said code checking circuit to connect an output signal to a predetermined output circuit.

12. In a digital information recovery system, the combination of, a transducer for deriving a regular periodic signal and parity checking signal from a recording medium, a parity checking circuit for providing a signal in response to a detected parity error, an information recovery circuit connected with said transducer for providing information-containing signals and parity signals to said parity checking circuit from said transducer, and circuit means responsive to the output of said parity checking circuit for providing an indication of the correct signal output.

13. In a digital information recovery system, the combination of, a transducer for deriving from a recording medium a regular periodic signal having predetermined portions representing preselected information and a parity signal, a parity checking circuit for providing a signal in response to a detected parity error, circuit means connected between said transducer and said parity checking circuit for conveying information-containing signals and parity signals to said parity checking circuit, and circuit means to provide a predetermined error indication in response to an error detection signal from said parity checking circuit.

14. In a digital information recovery system, the combination of, a transducer for deriving a regular periodic signal from a recording medium, circuit means connected to receive said regular periodic signal and adapted to detect an error therein, and coupling circuit means for connecting the output of said first-mentioned circuit means to a predetermined output circuit.

15. In a digital information recovery system as set forth in claim 14 wherein said regular periodic signal is of the self-clocking form.

16. In a digital information recovery system as set forth in claim 14 including an information recovery circuit connected with said transducer for connecting said regular periodic signal to said first-mentioned circuit means.

17. In a digital information recovery system as set forth in claim 16 wherein said information recovery circuit is adapted to separate information signals from said regular periodic signal.

18. In a digital information recovery system as set forth in claim 17 including parity checking circuit means connected to receive said information and also to receive parity signals and to detect an error in an information signal.

19. In a digital information recovery system as set forth in claim 18 including correcting circuit means connected with said first-mentioned circuit means and said information and parity checking circuit means to provide an indication of the correct signal output.

20. In a digital information recovery system, the combination of, a transducer for deriving a self-clocking information signal from a recording medium, first circuit means connected to receive a regular periodic signal from said self-clocking information signal, second circuit means connected with said transducer for providing said regular periodic signal to said first circuit means, and third circuit means connected with said first circuit means for providing an output when the presence of a signal error is detected.

References Cited in the file of this patent

UNITED STATES PATENTS

| | | |
|---|---|---|
| 2,948,884 | Guerber et al. | Aug. 9, 1960 |
| 2,951,229 | Goldstein | Aug. 30, 1960 |
| 2,954,433 | Lewis et al. | Sept. 27, 1960 |
| 2,976,517 | Fuller et al. | Mar. 21, 1961 |